(12) United States Patent
Tiwari

(10) Patent No.: US 8,732,379 B2
(45) Date of Patent: May 20, 2014

(54) ADAPTING LEGACY/THIRD PARTY IPS TO ADVANCED POWER MANAGEMENT PROTOCOL

(75) Inventor: Ashutosh Tiwari, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 41 days.

(21) Appl. No.: 13/285,100

(22) Filed: Oct. 31, 2011

(65) Prior Publication Data

US 2012/0198112 A1  Aug. 2, 2012

Related U.S. Application Data

(60) Provisional application No. 61/408,083, filed on Oct. 29, 2010.

(51) Int. Cl.
*G06F 13/36* (2006.01)
*G06F 1/00* (2006.01)

(52) U.S. Cl.
USPC ............................ 710/311; 710/306; 713/322

(58) Field of Classification Search
USPC .......... 710/305–306, 311, 313, 315; 713/300, 713/310, 322
See application file for complete search history.

(56) References Cited

U.S. PATENT DOCUMENTS 7,051,218 B1 * 5/2006 Gulick et al. ................. 713/310
2005/0097378 A1 * 5/2005 Hwang ......................... 713/320

FOREIGN PATENT DOCUMENTS

WO   WO 0246894 A2 * 6/2002

OTHER PUBLICATIONS

"TMS320DM816x DaVinci Digital Media Processors". Mar. 2011. Texas Instruments Incorporated. pp. 1-312.*
"TMS320DM642 Video/Imaging Fixed-Point Digital Signal Processor". Jul. 2002. Revised Aug. 2005. Texas Instruments Incorporated. pp. 1-178.*

* cited by examiner

*Primary Examiner* — Thomas J Cleary
(74) *Attorney, Agent, or Firm* — Robert D. Marshall, Jr.; W. James Brady; Frederick J. Telecky

(57) ABSTRACT

An apparatus adapts a pre-designed circuit module not supporting a power management protocol to a power management protocol. The apparatus disconnects a bus interface, disables interrupt and stops a clock to the pre-designed circuit module on a external idle request signal.

8 Claims, 6 Drawing Sheets

ADAPTING LEGACY/THIRD PARTY IPS TO ADVANCED POWER MANAGEMENT PROTOCOL

CLAIM OF PRIORITY

This application claims priority under 35 U.S.C. 119(e)(1) to U.S. Provisional Application No. 61/408,083 filed Oct. 29, 2010.

TECHNICAL FIELD OF THE INVENTION

The technical field of this invention is power consumption control in integrated circuits.

BACKGROUND OF THE INVENTION

Integrating a legacy/third party IP (such as a pre-designed circuit module) with limited support for power management in a next generation system on chip (SOC) with advanced power management scheme is very difficult. One solution is to redesign the IP so that it now meets all the advanced power management protocols. This takes lot of effort and also there is risk of breaking the existing functionality of the IP. It would be useful in the art to solve this problem without redesigning the IP.

SUMMARY OF THE INVENTION

An apparatus adapts a pre-designed circuit module not supporting a power management protocol to a power management protocol. The apparatus disconnects a bus interface, disables interrupt and stops a clock to the pre-designed circuit module on a external idle request signal.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
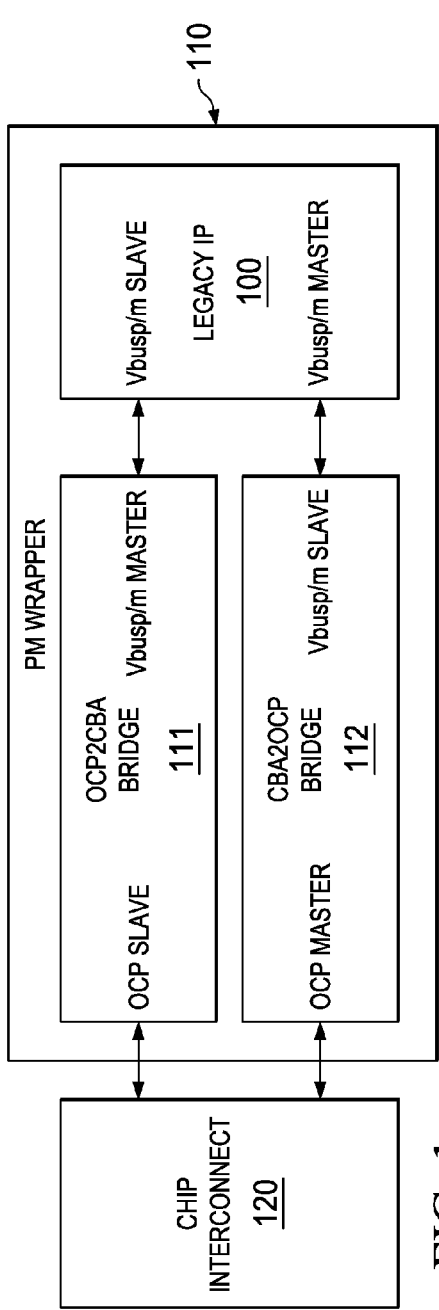
FIG. 1 illustrates prior art hardware to adapt a legacy/third party IP to an advanced power management protocol.

This invention provides a way for intellectual property (IP) circuit modules with limited power management support to adapt to advanced power management (PM) protocol without requiring any change inside. This meant developing some building blocks and defining an integration scheme for the IP. More details are captured in the attached slides.

This solution provides an efficient way to upgrade a legacy IP or third party IP to the advanced power management protocol without touching the IP internals. Other solution requires redesiging the IP circuit module. This is a huge effort that risks breaking existing functionality of the IP.

This invention is a generic and efficient approach employing little effort. This invention is ideal for third party IPs where IP internals cannot be touched.

The problem addressed by this invention is power consumption control in integrated circuits. There is a strong drive towards low power solutions require System on Chips (SOCs) to have complex power management schemes. Such complex power management schemes require sophisticated PM protocol to manage power states of IPs. Such sophistication is possible for new IP designs. This is a challenge for legacy/third party IPs. Generally legacy/third party IPs have support for different or simpler PM protocols. These need to change to work with new IPs in a SOC. Inclusion of bus adapter bridges to make legacy/third party IPs compliant to a common bus protocol makes changing or adapting to a new PM protocol even more challenging. Generally change in PM protocol requires opening up of IP core logic. This requires a huge effort with the risk of breaking existing functionality.

This invention is an approach enabling legacy/third party IPs to adapt to an new PM protocol without impacting the IP core logic. This invention develops some building blocks and a specific integration scheme to follow.

The PM used in most of the legacy/third party IPs is called the Clkstop_req/ack protocol. The Clkstop_req protocol is asserted to the IP indicating that chip level power controller wants to stop clocks to the IP. The IP finishes all on-going tasks and then asserts clkstop_ack. Pending tasks include: pending interrupts; pending Common Bus Protocol (CBA) transactions; any other tasks such as I/O activities. All clocks to the IP can be gated-off when IP has asserted clkstop_ack. This protocol also covers about wakeup events but it this aspect of the protocol is not used by most of the IPs. This protocol is same for initiator and target interfaces.

Another PM protocol used in legacy IPs is the IDLE/STANDBY protocol. In the IDLE protocol the clocks associated with target interface of IP are managed. A chip level power controller asserts SIdleReq to the IP indicating that power controller wants to stop clocks to the IP. The IP asserts SIdleAck after finishing all pending tasks. Pending tasks include: pending interrupts; pending Open Core Protocol (OCP) transactions; and any other pending tasks such as I/O activity. An OCP clock to the IP can be gated-off once IP has asserted SIdleAck.

A third PM protocol used in legacy IPs is the STANDBY protocol. This protocol manages clocks associated with the initiator interface of IP. The IP asserts STANDBY when it has nothing to be done on it's initiator interface. A chip level power controller asserts WAIT signal in response to such a STANDBY assertion. The IP clocks associated with initiator interface can be gated-off after WAIT assertion.

A fourth PM protocol used in legacy IPs is the OCP disconnect protocol. This protocol allows clean disconnection of an OCP socket. Either the initiator or the target can request disconnection. An OCP socket is connected only when both initiator and target are willing to connect the OCP interface.

FIG. 1 illustrates prior art hardware to adapt a legacy/third party IP to an advanced PM. PM wrapper 110 is connected to SoC chip interconnect 120. PM wrapper 110 includes legacy IP 100. According to the area of this invention legacy IP 100 does not support the desired advanced PM. PM wrapper 110 includes OCP2CBA bridge 111 connected between chip interconnect 120 and legacy IP 100. OCP2CBA bridge 111 communicates with chip interconnect 120 as an OCP slave. OCP2CBA bridge 111 communicates with legacy IP 100 as a CBA master. PM wrapper 110 further includes CBA2OCP bridge 112 connected between chip interconnect 120 and legacy IP 100. CBA2OCP bridge 112 communicates with chip interconnect 120 as an OCP master. CBA2OCP bridge 112 communicates with legacy IP as a CBA slave.

The following steps enable a legacy/third party IP to be compliant with an advanced PM protocol. (1) The bus interface is changed to OCP. This assumes that the IP has a CPA interface. As illustrated in FIG. 1 this is achieved via OCP2CBA bridge 111 and CBA2OCP bridge 112. (2) The new PM protocol includes changing a synchronous reset to an asynchronous reset. (3) Change pulse interrupts to level interrupts.

The following steps enable a legacy/third party IP with a target interface enter the IDLE state. (1) Request disconnection on OCP port and wait for acknowledgement (ACK). (2) Assert clkstop_req to the IP and wait for ACK. (3) Gate clocks to all modules inside the IP. (4) Make sure that the OCP interface never hangs.

The sequence of events 1 and 2 in entering the IDLE state is important. If the OCP disconnection is requested first, (event 1 followed by event 2), then: the master will disconnect OCP at clean boundary and then false ACK all new transactions; if IP was waiting for an interrupt service, then the IP will never acknowledge clkstp_req in response to event 2. If the clkstop_req is asserted first (event 2 followed by event 1), then; the IP will finish all pending tasks and then acknowledge clkstp_req; because OCP is still connected, there may arise a new CBA request due to a new OCP command after receiving clkstp_ack from the IP; and the IP will not respond to this new CBA request. If these two events occur together, then there will be one of the above problems depending upon which ACK comes first.

Figure 2:
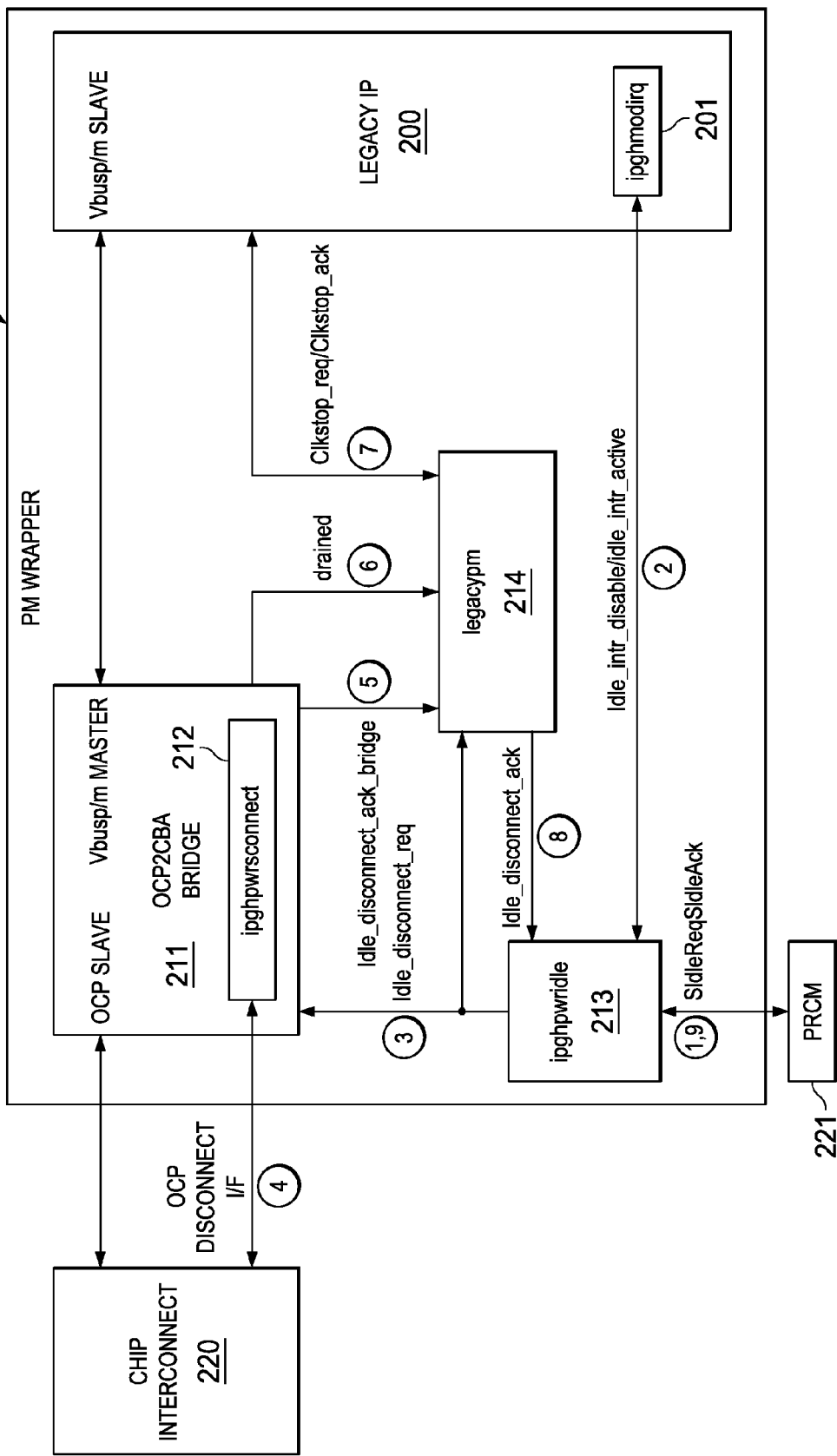
FIG. 2 illustrates hardware of one embodiment of this invention.

FIG. 2 illustrates hardware of one embodiment of this invention. PM wrapper 210 includes: legacy IP 200 which further includes ipghmodirq 201; OCP2CBA bridge 211 which further includes ipghpwrsconnect 212; ipghpwridle 213; and legacypm 214. OCP2CBA bridge 211 communicates with chip interconnect 220 as an OCP slave. These is an OCP disconnect interface between chip interconnect 220 and ipghpwrsconnect 212. OCP2CBA bridge 211 communicates with legacy IP 200 as a CBA master. Ipghpwrsconnect 212 communicates with chip interconnect 220 via the OCP disconnect interface. Ipghpwridle 213 receives idle requests (Sidle) from external PRCM 221 and supplies idle acknowledgement (SidleAck) to external PRCM 221. Ipghprwidle 213 supplies an idle interrupt disable signal (idle_intr_disable) to ipghmodirq 101 and receives an idle interrupt active signal (idle_intr_active) from ipghmodirq 101. Ipghprwidle 213 supplies an idle disconnect request (idle_disconnect_req) to OCP2CBA bridge 211 and legacypm 214. Ipghprwidle 213 receives idle disconnect acknowledgement (idle_disconnect_ack) from legacypm 214. Legacypm 214 receives an idle disconnect request (idle_disconnect_req) from ipghpwridle 213. Legacypm 214 receives an idle disconnect acknowledge signal (idle_disconnect_ack_bridge) from OCP2CBA bridge 211. Legacypm 214 receives a drained signal from OCP2CBA bridge 211. Legacypm 214 supplies a clock stop request signal (clkstop_req) to legacy IP 200 and received a clock stop acknowledge signal (clkstop_ack) from legacy IP 200. Legacypm 214 supplies an idle disconnect acknowledgement signal (idle_disconnect_ack) to ipghpwridle 213.

This invention includes the following sequence. (1) Disable new interrupts and wait for completion of pending interrupts. Ipghmodirq 214 IPGeneric is instantiated in IP core to implement interrupt generation logic. This allows using an intr_disable/intr_active interface of ipghmodirq 214 for interrupt gating. This also permits knowing the status of pending interrupts. This IPGeneric also converts pulse interrupts to level interrupts. (2) Handle OCP disconnection in OCP2CBA bridge 211. Instantiate ipghpwrsconnect IPGeneric inside bridge. (3) Instantiate a new legacypm 101 module to: throttle the ACK from ipghpwrsconnect IPGeneric to handle clkstop_req/ack interface with IP core. (4) Add CBA status tracking logic in CBA2OCP bridge 211 so that clkstop_req to IP is asserted only when CBA interface and bridge is IDLE. This ensures that IP will not see new CBA request when under clkstop_req. (5) Ipghpwridle 213 IPGeneric is instantiated to control all the logic explained above.

The following sequence executes an Idle state. These actions are marked by the circled numbers in FIG. 2. (1) PRCM 221 asserts SIdleReq. (2) Ipghpwridle 213 asserts idle_intr_disable to ipghmodirq 101 and waits for idle_intr_active from ipghmodirq 101 to go low. This means that all pending interrupts are serviced and new interrupts are disabled. (3) Ipghpwridle 213 asserts idle_disconnect_req to the OCP2CBA bridge 211. This request is forwarded to the ipghpwrsconnect 212. (4) Ipghpwrsconnect 212 requests disconnection to the OCP initiator. This OCP initiator disconnects OCP when there are no outstanding OCP transactions. (5) Ipghpwrsconnect 212 asserts idle_disconnect_ack_bridge to legacypm 214. Note this acknowledgement is routed to legacypm 214 instead of to ipghpwridle 213. (6) OCP2CBA bridge 211 asserts drained to legacypm 214 when CBA interface is IDLE. (7) Legacypm 214 asserts idle_clkstop_req to legacy IP 200 via ipghmodirq 201 and waits for the acknowledgement idle_clkstop_ack from ipghmodirq 101. (8) Legacypm 212 asserts idle_disconnect_ack to ipghpwridle 213. (9) Ipghpwridle 213 asserts SIdleAck to PRCM 221.

Figure 3:
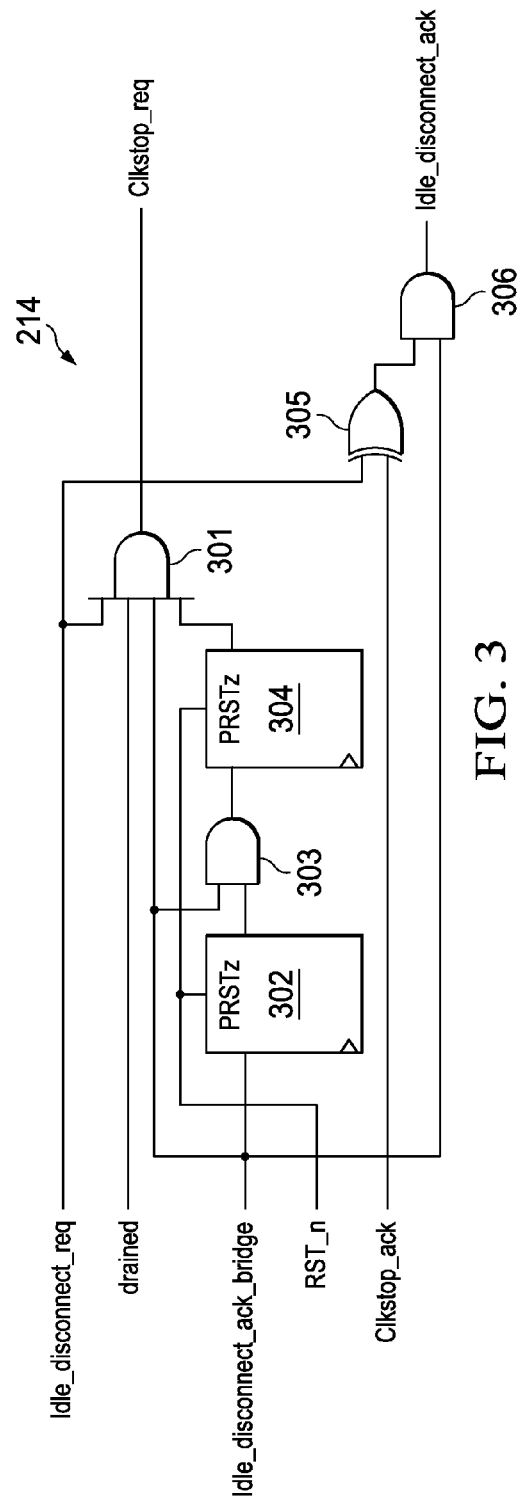
FIG. 3 illustrates a block diagram of Legacypm illustrated in FIG. 2.

FIG. 3 illustrates a block diagram of Legacypm 214. Legacypm 214 includes: AND gates 301, 303 and 306; flip-flops 320 and 303; and exclusive NOR gate 305. AND gate 301 received the idle_disconnect_req, the drained signal, the idle_disconnect_ack_bridge signal and the idle_disconnect_ack_bridge signal delayed two cycles by the two flip-flops 302 and 304. Flip-flop 302 delays output until a next RST_n signal. AND gate 303 triggers flip-flop 304 only if the idle_disconnect_ack_bridge signal and the delayed signal from flip-flop 302 are the same. Flip-flop 304 delivers the two cycle delayed signal to AND gate 301. The delay of idle_disconnect_ack by 2 cycles allows drained to stabilize. Drained indicates that CBA interface is IDLE. This 2 cycle delay takes care of the corner case when bridge receives a new OCP request such as a posted write just before OCP disconnection. AND gate 301 asserts clkstop_req when: OCP2CBA bridge 211 is under idle_disconnect_req and OCP is disconnected; and OCP2CBA bridge 211 is drained.

Legacypm 214 asserts idle_disconnect_ack upon clkstop_ack assertion. Exclusive NOR gate conditions this on either both idle_disconned_req and Clkstop_ack being active or neither being active. This makes sure that legacy IP 200 is put under clkstop_req only when there are no outstanding transactions in the bridge. An alternative embodiment puts the legacypm logic inside OCP2CBA bridge 221 further reducing the work at the IP level.

Figure 4:
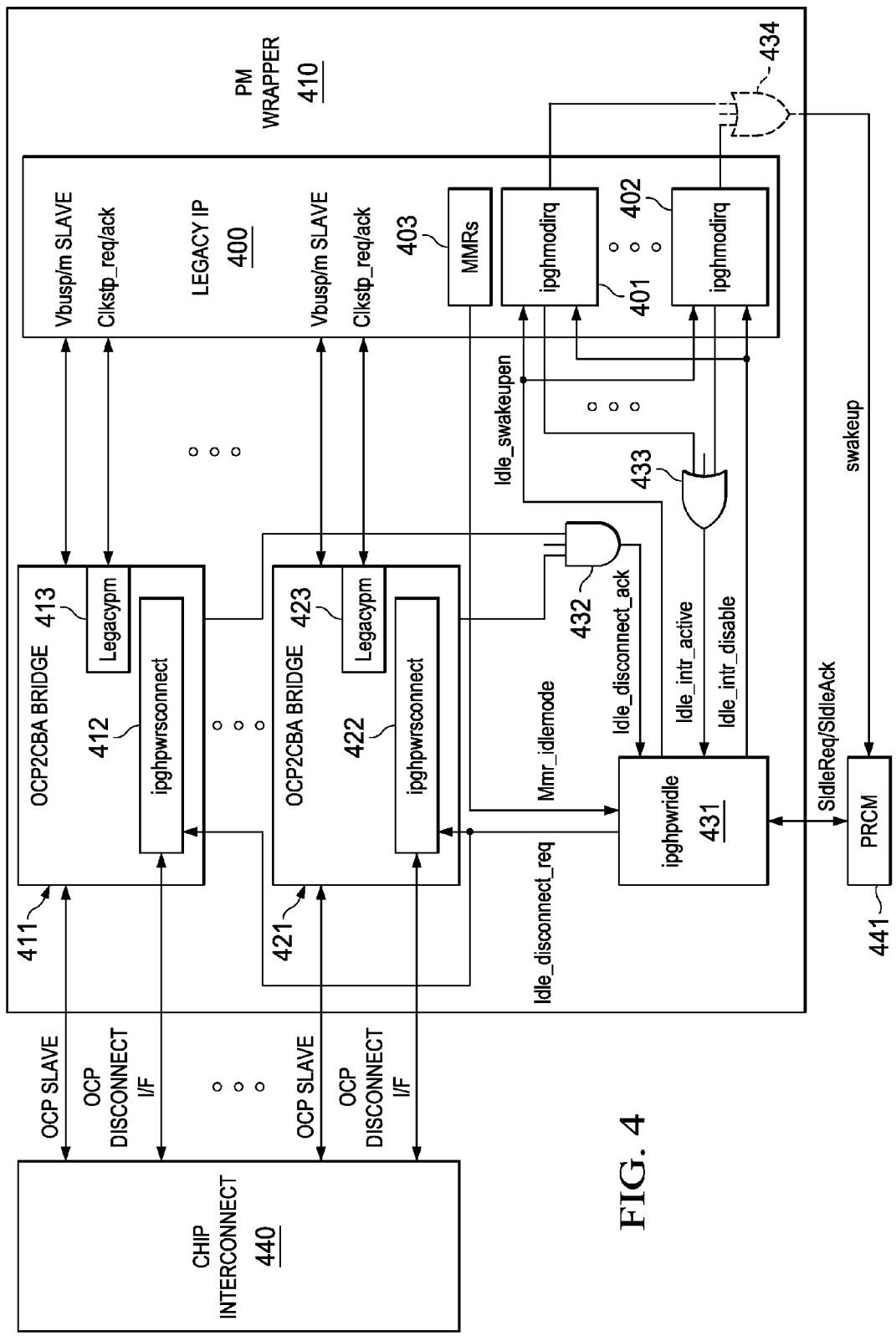
FIG. 4 illustrates another embodiment of this invention including multiple target interfaces.

FIG. 4 illustrates another embodiment of this invention including multiple target interfaces. FIG. 4 is similar to FIG. 2, except that there are plural OCP2CBA bridges 411 and 421 rather than a single OCP2CBA bridge 211. Each OCP2CBA bridge 411 and 421 includes a corresponding ipghpwrsconnect 412 and 422. As noted in the alternative embodiment discussed above each OCP2CBA bridge 411 and 421 includes a corresponding legacypm 413 and 423. The idle_disconnect_ack signals from the plural OCP2CBA bridges 411 and 421 are combined by AND gate 432 and supplied to ipghpwridle 431. Likewise the idle_intr_active single from plural ipghmodirq 401 and 402 within legacy IP 400 are combined by OR gate 433 for supply to ipghpwridle 431. Memory mapped registers (MMRs) 403 within legacy IP 400 stores mode indicators such as an idle mode indication (Mmr_idlemode) supplied to ipghpwridle 431. Lastly, the swakeup signals from the plural ipghmodirq 401 and 402 are combined by OR gate 434 for supply to PRCM 441.

New PM protocol requires proactive assertion of STANDBY when initiator interface is idle. In general, legacy IPs have no such proactive indicator. This application includes two embodiments to handle initiator interface. The first embodiment uses an IDLE protocol on a target interface to initiate STANDBY process. This embodiment assumes that each initiator interface to each legacy IP always has a target interface. The second embodiment depend upon software to trigger the STANDBY process. This embodiment uses no hardware logic to check if the initiator interface is idle before asserting STANDBY. In either case OCP disconnection is handled in CBA2OCP bridge in the corresponding ipghpwrmconnect 412 and 422.

Figure 5:
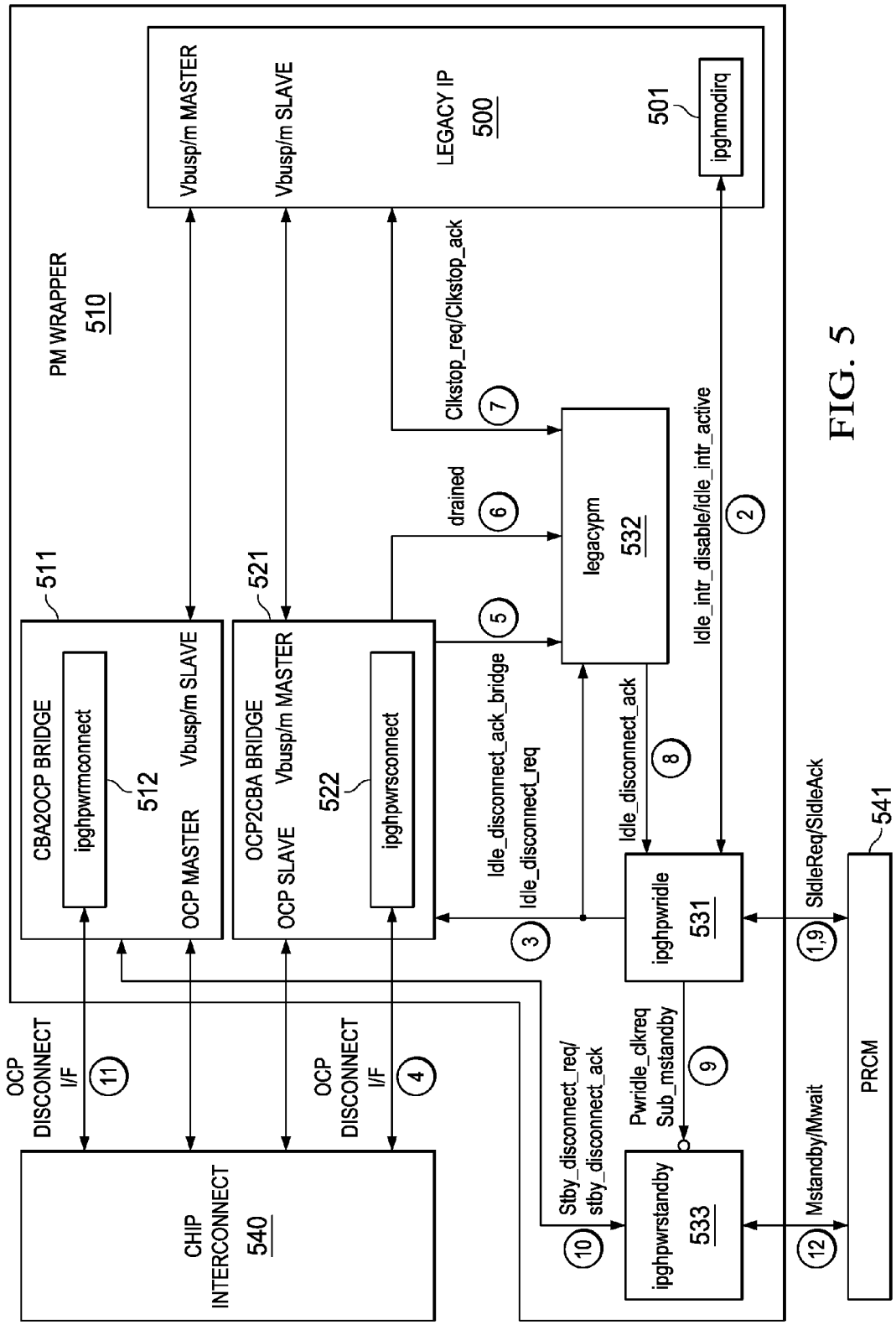
FIG. 5 illustrates the hardware used in a first embodiment of a STANDBY sequence.

FIG. 5 illustrates the hardware used in this first embodiment. FIG. 5 is similar to a combination of FIGS. 1 and 2. FIG. 5 includes CBA2OCP bridge 511 which is similar to CBA2OCP bridge 111 illustrated in FIG. 1. CBA2OCP bridge 511 further includes ipghprmconnect 512. FIG. 5 includes legacy IP 500 including ipghmodirq 501 similar to legacy IP 200 and ipghmodirq 201 illustrated in FIG. 2. FIG. 5 includes OCP2CBA bridge 521 including ipghpwrsconnect 522 similar to OCP2CBA bridge 211 and ipghpwrsconnect 212 illustrated in FIG. 2. FIG. 5 illustrates ipghprwidle 531 similar to ipghpwridle 213 illustrated in FIG. 2. FIG. 5 illustrates legacypm 532 similar to legacypm 214 illustrated in FIG. 5. FIG. 5 further illustrates ipghpwrstandby 533 used in the this STANDBY sequence as described below.

The STANDBY sequence in the first embodiment is as follows. These actions are marked by the circled numbers in FIG. 5. (1) PRCM 541 asserts SIdleReq. (2) Ipghpwridle 531 asserts idle_intr_disable to ipghmodirq 101 and waits for idle_intr_active from ipghmodirq 501 to go low. This means that all pending interrupts are serviced and new interrupts are disabled. (3) Ipghpwridle 531 asserts idle_disconnect_req to the OCP2CBA bridge 521. This request is forwarded to the ipghpwrsconnect 522. (4) Ipghpwrsconnect 522 requests disconnection to the OCP initiator. This OCP initiator disconnects OCP when there are no outstanding OCP transactions. (5) Ipghpwrsconnect 522 asserts idle_disconnect_ack_bridge to legacypm 533. Note this acknowledgement is routed to legacypm 533 instead of to ipghpwridle 531. (6) OCP2CBA bridge 521 asserts drained to legacypm 532 when CBA interface is IDLE. (7) Legacypm 533 asserts idle_clkstop_req to legacy IP 500 via ipghmodirq 501 and waits for the acknowledgement idle_clkstop_ack from ipghmodirq 501. (8) Legacypm 533 asserts idle_disconnect_ack to ipghpwridle 531. (9) Ipghpwridle 531 asserts SIdleAck to PRCM 541. (10) Ipghpwrstandby 534 asserts stby_disconnect_req to CBA2OCP bridge 511 which is routed to the ipghpwrmconnect 512. (11) OCP initiator interface is disconnected at CBA2OCP bridge 511. (12) Ipghpwrstandby 534 asserts STANDBY to PRCM 541.

This first embodiment of the STANBY sequence requires that first IDLE protocol needs to be initiated by PRCM 541 and only then STANDBY will be asserted. This solution is not optimal from power savings point of view because this loses all the savings from powering down targets associated with the IPs initiator interface if STANDBY indication was proactive.

PRCM 541 needs to be modified to make this work. In an auto sleep mode PRCM 541 initiates IDLE process with legacy IP 500 only when the IP initiator interface is in STANDBY. This proposal relies on the IDLE protocol to initiate STANDBY.

Figure 6:
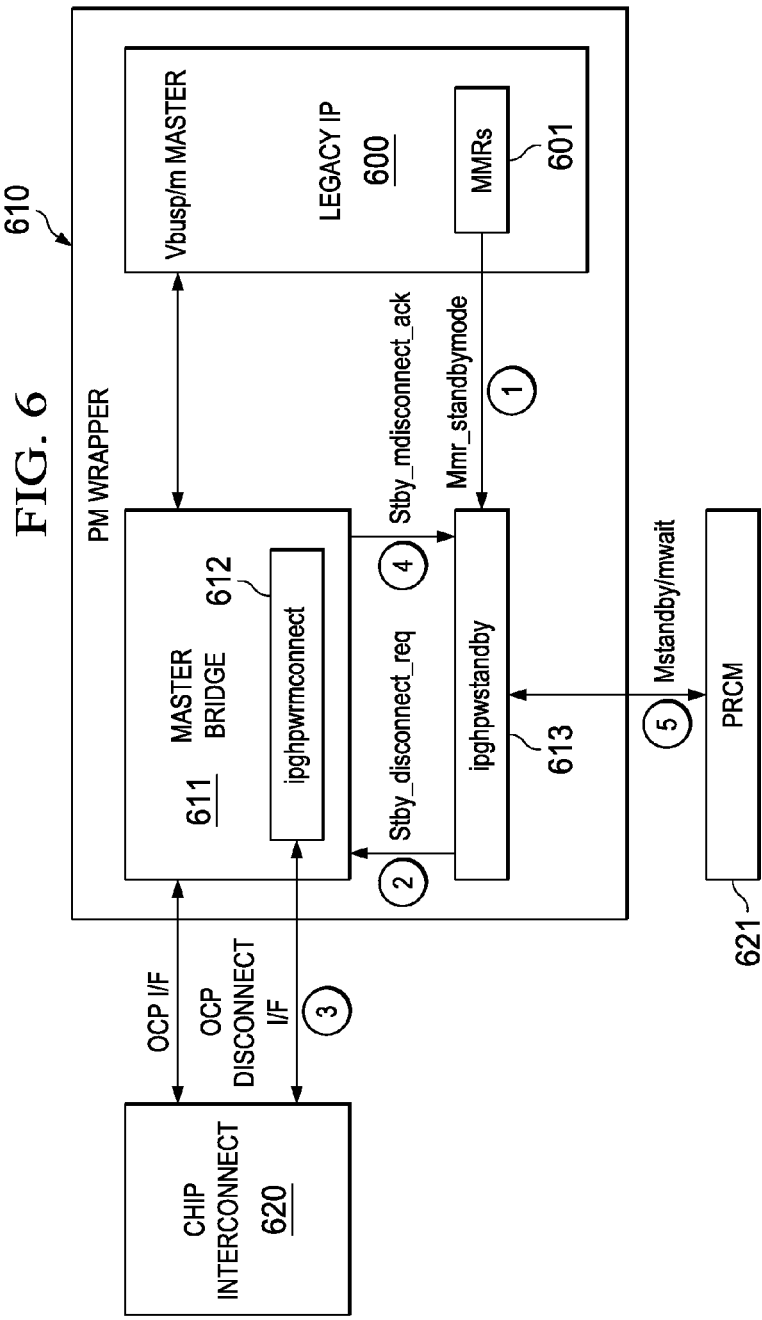
FIG. 6 illustrates the hardware used in a second embodiment of the STANDBY sequence.

FIG. 6 illustrates the hardware used in the second embodiment of the STANDBY sequence. PM wrapper 610 includes: legacy IP 600 which further includes MMRs 601; master bridge 611 which further includes ipghpwrsconnect 612; and ipghpwrstandby 613. Master bridge 611 communicates with chip interconnect 620 and legacy IP 600. Ipghpwrsconnect 612 communicates with chip interconnect 220 via the OCP disconnect interface. Ipghpwrstandby 213 receives standby requests (Mstandby) from external PRCM 621 and supplies a wait signal (Mwait) to external PRCM 621. The standby mode signal (Mmr_standbymode) is generated by MMRs 601 within legacy IP 600.

The following sequence executes a STANDBY state. These actions are marked by the circled numbers in FIG. 6. (1) A software write to a standbymode register within MMRs 601 inside legacy IP 600 initiates the standby mode. (2) Ipghpwrstandby 613 asserts stby_disconnect_req to master bridge 611. (3) The OCP initiator interface is disconnected via inghpwrconnect 612. (4) Master bridge 611 asserts stby_disconnect_ack to the ipghpwrstandby 613. (5) Ipghpwrstandby 613 asserts STANDBY to PRCM 621.

This second embodiment of the STANDBY sequence pushes all the responsibility to software. This is not optimal from power savings perspective as the STANDBY indication is not hardware controlled.

Figure 7:
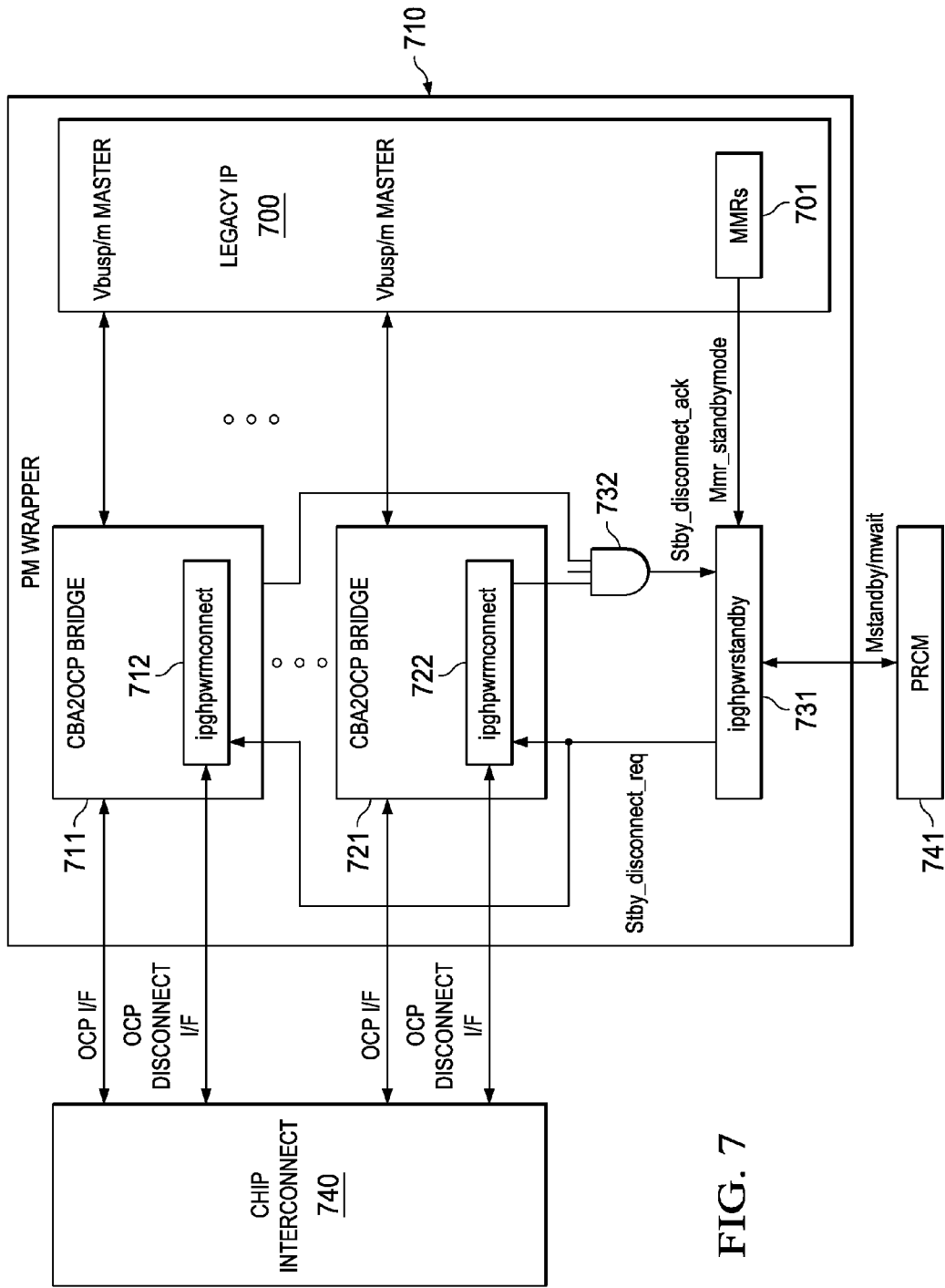
FIG. 7 illustrates another embodiment of this invention similar to that illustrated in FIG. 6 including multiple target interfaces.

FIG. 7 illustrates another embodiment of this invention including multiple target interfaces. FIG. 7 is similar to FIG. 6, except that plural OCP2CBA bridges 711 and 721 rather than a single master bridge 611. Each OCP2CBA bridge 711 and 721 includes a corresponding ipghpwrsconnect 712 and 722. The Stby_mdiconnect_ack signals from the plural OCP2CBA bridges 711 and 721 are combined by AND gate 732 and supplied to ipghpwrstandby 731.

The first embodiment is better from the power savings perspective as STANDBY assertion is hardware controlled. The second embodiment is advantageous because it has minimal impact on the legacy IP and the PRCM.

What is claimed is:

1. An apparatus for adapting a pre-designed circuit module not supporting a power management protocol to a power management protocol, the pre-designed circuit module having a bus interface, a clock stop request input and a interrupt disable input, the apparatus comprising:

a bus bridge circuit connected to the bus interface of the pre-designed circuit module and adapted for connection to an external bus, said bus bridge circuit including a disconnection circuit applicable to selectively connect the bus interface of the pre-designed circuit module and the external bus, said bus bridge circuit being further operable to determine when bus traffic is idle and generating a drained signal indicative of whether bus traffic is idle;

an idle circuit having an external input operable to receive an idle request signal, an interrupt disable request output connected to the interrupt disable input of the pre-designed circuit module, said idle circuit generating said interrupt disable request upon receipt of said idle request signal; and a power management circuit having a clock stop output connected to the clock stop request input of the pre-designed circuit module operable to send a clock stop request signal to the pre-designed circuit module following said idle request signal, said power management circuit further having a drained input connected to said drained output of said bus bridge circuit, said power management circuit further operable to defer generation of said interrupt disable output until said drained signal indicates bus traffic is idle.

2. The apparatus of claim 1, wherein:
said idle circuit has an idle disconnect output connected to said disconnection circuit operable to supply a disconnect signal to said disconnection circuit upon receipt of said idle request signal.

3. The apparatus of claim 1, wherein:
said idle circuit further has a bus disconnect output connected to said disconnection circuit adaptable to control said disconnection circuit to disconnect the bus interface of the pre-designed circuit module and the external bus;
said power management circuit includes a multi-input AND gate having a first input connected to said bus disconnect output, a second input receiving said drained signal, said multi-input AND gate having an output generating said clock stop request signal.

4. The apparatus of claim 3, wherein:
said idle circuit further has an idle disconnect output connected to said disconnection circuit operable to supply a disconnect signal to said disconnection circuit upon receipt of said idle request signal;
said disconnection circuit further has a disconnect acknowledge output operable to generate a disconnect acknowledge signal indicating receipt of said disconnect signal; and
said multi-input AND gate of said power management circuit further including a third input receiving said disconnect acknowledge signal and a fourth input receiving said disconnect acknowledge signal delayed by a predetermined period of time.

5. The apparatus of claim 4, wherein:
said predetermined period of time is two clock cycles.

6. The apparatus of claim 4, wherein:
the pre-designed circuit module further having a clock stop request acknowledge output generating a signal acknowledging receipt of the clock stop request input;
said power management circuit further includes an input receiving said disconnect acknowledge signal from said disconnection circuit, an input receiving the clock stop request acknowledge from the pre-designed circuit module and an output supplying to said idle circuit a disconnect acknowledge signal indicating receipt of said disconnect acknowledge signal and the clock stop request acknowledge.

7. The apparatus of claim 6, wherein:
said power management circuit further includes
   an inverting exclusive OR gate having a first input receiving said disconnect acknowledge signal from said disconnection circuit, a second input receiving the clock stop request acknowledge from the pre-designed circuit module and an output, and
   an AND gate having a first input connected to said output of said inverting exclusive OR gate, a second input receiving said disconnect acknowledge signal from said disconnection circuit and an output supplying said disconnect acknowledge signal to said idle circuit.

8. The apparatus of claim 1, wherein:
said pre-designed circuit module includes at least one memory mapped register operable to have predetermined data indicating an idle mode written therein; and
said idle circuit is responsive to said memory mapped register operable storing said predetermined data to generate said interrupt disable request.

* * * * *